Figure 2:
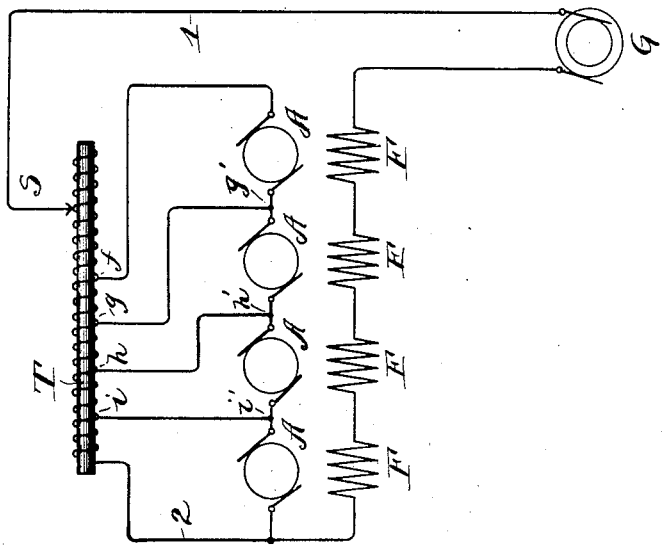

No. 823,220. PATENTED JUNE 12, 1906.
D. C. JACKSON.
CIRCUIT CONNECTION FOR AND METHOD OF OPERATING ALTERNATING MOTORS.
APPLICATION FILED MAY 16, 1904.

3 SHEETS—SHEET 1.

Witnesses:
Arthur H. Boettcher
Charles J. Schmidt

Inventor
Dugald C. Jackson
By Charles A. Brown
Attorney

No. 823,220. PATENTED JUNE 12, 1906.
D. C. JACKSON.
CIRCUIT CONNECTION FOR AND METHOD OF OPERATING ALTERNATING MOTORS.
APPLICATION FILED MAY 16, 1904.
3 SHEETS—SHEET 2.
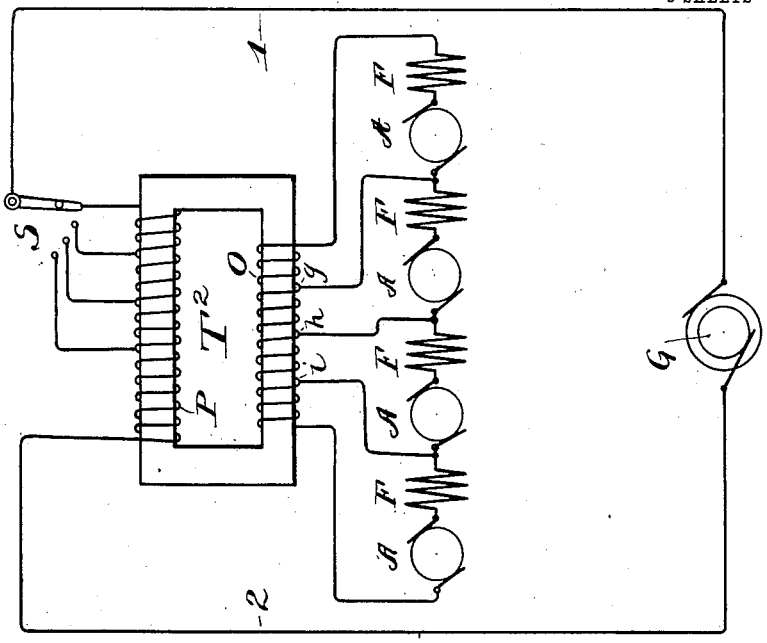
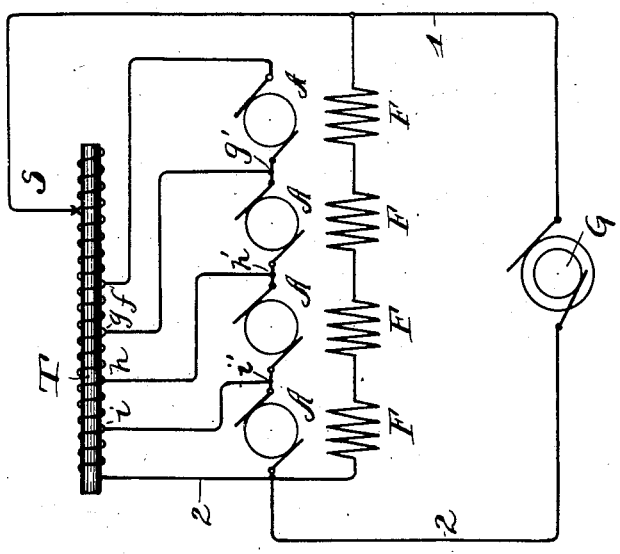
Witnesses:
Arthur H. Boettcher,
Charles J. Schmidt.
Inventor
Dugald C. Jackson
By Charles A. Brown
Attorney No. 823,220. PATENTED JUNE 12, 1906.
D. C. JACKSON.
CIRCUIT CONNECTION FOR AND METHOD OF OPERATING ALTERNATING MOTORS.
APPLICATION FILED MAY 16, 1904.

3 SHEETS—SHEET 3.

Witnesses:
Arthur H. Boettcher,
Charles J. Schmidt.

Inventor
Dugald C. Jackson
By Charles A. Brown
Attorney.

UNITED STATES PATENT OFFICE.

DUGALD C. JACKSON, OF MADISON, WISCONSIN.

CIRCUIT CONNECTION FOR AND METHOD OF OPERATING ALTERNATING MOTORS.

No. 823,220.  Specification of Letters Patent.  Patented June 12, 1906.

Application filed May 16, 1904. Serial No. 208,063.

*To all whom it may concern:*

Be it known that I, DUGALD C. JACKSON, a citizen of the United States, residing at Madison, in the county of Dane and State of Wisconsin, have invented a certain new and useful Improvement in Circuit Connections for and Method of Operating Alternating Motors, of which the following is a full, clear, concise, and exact description, reference being had to the accompanying drawings, forming a part of this specification.

My invention relates to the operation of alternating-current electric motors; and its object is to provide improved means and an improved method for starting such motors for varying their speeds and for proportionately dividing the line-pressure between several motors connected in series.

My invention, therefore, has particular application to electric motors used in the service of electric traction or in other service where speed variation and control is desired. For instance, in electric traction service four motors mounted on the four axles of an eight-wheel electric-railway car may be connected in series. In this case some difficulty and embarrassment arise in affording means for getting all of the motors started at approximately an equal rate, and there is also difficulty experienced under some conditions in maintaining the several serially-connected motors all at the same rate of working.

It is the object, therefore, of my invention to provide an advantageous and efficient means for supplying the current to motors at starting with the circuit-pressure duly divided between the motors, and it also provides for maintaining a suitable apportionment of the rate of work of the motors at all speeds.

I obtain this efficient operation and control of the motors by employing autotransformers or equivalent ordinary transformers connected with the motors in such manner that the pressure of the system is equally or otherwise suitably apportioned between the various motors to thus insure the production of an equal amount of work by each motor. Various arrangements of the motor fields and armatures and the connection therewith with the line and transformers may be employed, and the transformers may at the same time be used as an efficient starting and controlling means besides serving to apportion the pressure.

My invention can be better and more fully explained with reference to the accompanying drawings, in which—

Figures 1 to 6 show modified arrangements of the motor fields and armatures and their connection with the transformers and the line.

Figure 1:
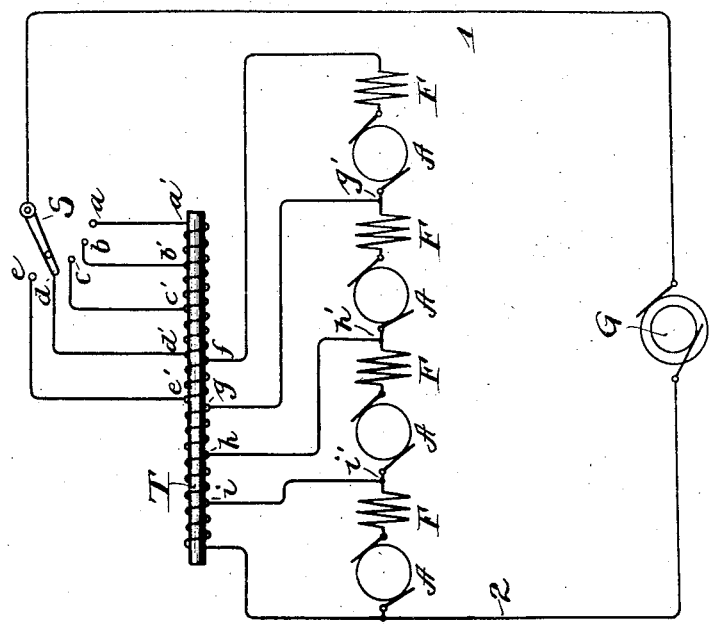

In Fig. 1 I have represented four alternating-current motors the armatures A and the fields F of which are connected serially together. A switch-arm S is adapted to travel over switch-contacts $a$, $b$, $c$, $d$, and $e$, connected with points $a'$, $b'$, $c'$, $d'$, and $e'$ of the winding of the autotransformer T, and by means of the switch more or less of the autotransformer-winding may be included in circuit with the line-limbs 1 and 2, supplied from a generator G. The series of motors is connected between the point $f$ and the line-limb 2, and thus the motors are connected in series relation between the line-wire 1 and the line-wire 2 when the controlling-switch S engages the contact $d$, and at the same time the full line-pressure is impressed upon the autotransformer-winding between the point $f$ and the line-wire 2. Leads $g$, $h$, and $i$ lead from appropriate points $g'$, $h'$, and $i'$ on the autotransformer-winding to the points of connection between the several motors, so as to divide the line-pressure equally, or in other suitable proportions, between the several motors.

When the motors are stopped, the switch S is open, and to start the motors the switch-lever is moved to the starting position $a$ and the several motors are subjected to low pressure. The pressure upon the motors and their speed may be increased by moving the switch-lever over the contact-points $b$ and $c$ and to the point $d$, when full line-pressure is impressed upon the motors, this pressure being equally divided between them by the autotransformer, so that they are impelled to work at equal rates if they are of substantially similar construction. If it is desired to increase the speed of the motors, the switch-lever may be moved to the point $e$, when the pressure across the motors is increased above that of the line, and the speed will be accordingly increased.

The number of stops or positions in the controlling-switch may be made appropriate to the conditions of the particular service, or the controllable feature of the autotransformer may be omitted and the line conductor 1 connected directly to some part of the autotransformer-winding. The winding of the autotransformer may be of reduced cross-section from the point e to the end connected to line conductor 2, if desired, and weight and expense may thereby be reduced.

In Fig. 2 I have shown an equivalent arrangement in which the autotransformer is connected across the armature-circuits alone, the current first passing through the armatures, of which the pressures are apportioned by the autotransformer T, and then passing serially through the fields F of the motors.

A somewhat similar arrangement might be adopted, as shown in Fig. 3, in which the several fields are connected in a series across the main-line limbs 1 and 2, and the armatures, with their autotransformer, may be connected as another branch between the line-limbs.

Figure 4:
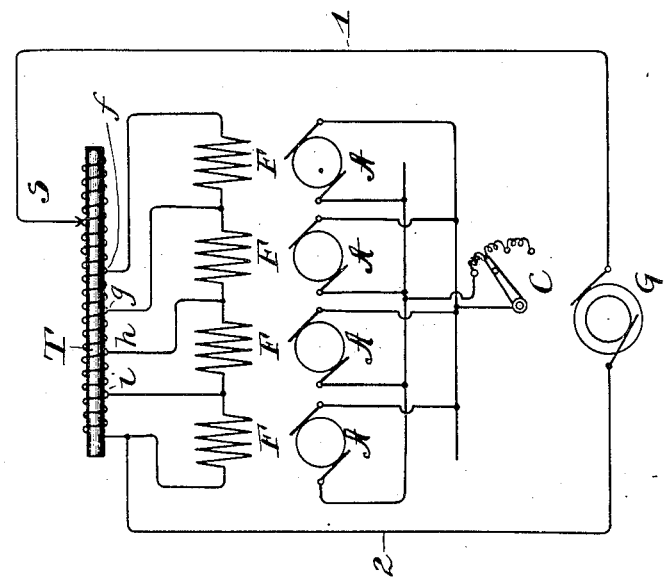

Fig. 4 represents the arrangement applied to repulsion-motors, and here the autotransformer is connected so as to distribute the pressure appropriately between the field-windings F F of the motors, and the several armatures A A are connected in a local circuit, which may contain a variable controller C, by means of which more or less resistance or impedance may be included in the local armature-circuit and the speed of the motors further controlled, or each armature-circuit may be separately closed.

Figure 5:
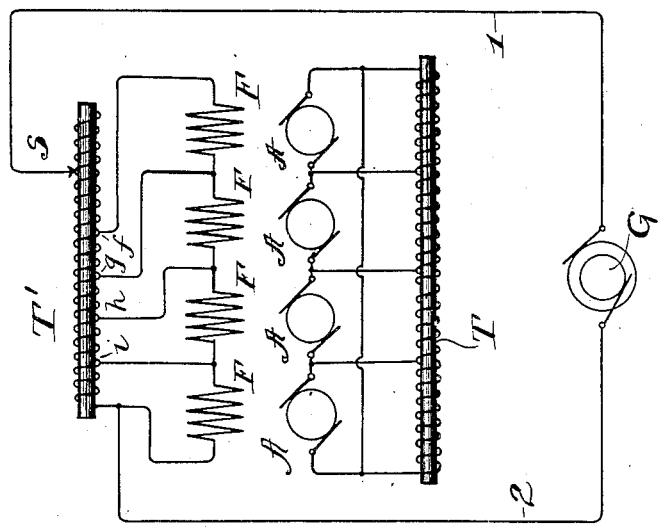

Fig. 5 also represents the arrangement applied to repulsion-motors, with a second autotransformer T introduced between the terminals of the armatures A A in such a way that the pressure may be simultaneously varied between the field-terminals and the induced pressure at all times be properly apportioned between the armature-windings. The fields F F are associated with the autotransformer T' and the pressure across the limbs 1 and 2 thereby proportionately distributed.

The starting and controlling feature of the switch S may be utilized in both the arrangements shown in Figs. 4 and 5, although the line-limb 1 might be directly connected with some part of the autotransformer-windings.

Instead of an autotransformer an equivalent ordinary transformer with subdivided primary or secondary coils may be employed, and in Fig. 6 I have shown a modified arrangement in which an ordinary transformer $T^2$ is employed, and by means of the controlling-switch S more or less of the primary winding P may be bridged between the line-limbs 1 and 2, and thereby more or less pressure induced and distributed in the secondary winding O. The motors have their armatures A and their fields F all connected serially together and included serially in circuit with the secondary winding, appropriate points g, h, and i of the primary winding being connected to points between the several motors, so that the secondary pressure will be equally or otherwise appropriately divided between the several motors.

My invention may also be utilized with induction-motors as well as with the series and repulsion motors, as herein shown. It may also be used with polyphase motors, in which case an autotransformer may be introduced with each phase in connection with the series-connected primary windings of the motors which belong to that phase, or a single autotransformer related to one phase alone may be relied upon to suitably apportion the total impressed pressure, and various other modifications may be made in the arrangement of the motor armatures and fields and their connection with the transformers and the line without departing from the scope of the invention, and I do not wish to be limited to the arrangements herein shown. I use the word "transformer" in the sense of either an autotransformer (which ordinarily possesses only one winding) or an ordinary transformer with a plurality of windings.

I claim as new and desire to secure by Letters Patent—

1. The combination with a plurality of alternating-current motors connected serially in a circuit bridging between the limbs of an alternating-current circuit, of means for maintaining, at the several motors, fixed proportions of the pressure impressed on the series.

2. The combination with an alternating-current circuit, of a plurality of serially-connected motors jointly driving a load, and means for maintaining the total impressed pressure proportionately divided between said motors.

3. The combination with a plurality of alternating-current motors connected serially in a circuit bridging between the limbs of an alternating-current circuit, of an autotransformer for dividing the line-pressure proportionately between said motors.

4. The combination with a plurality of alternating-current motors connected serially in a circuit bridging between the limbs of an alternating-current circuit, of transformer means for dividing the line-pressure proportionately between windings of said motors.

5. The combination with a plurality of alternating-current motors connected serially in a circuit bridging between the limbs of an alternating-current circuit, of autotransformer means for dividing the line-pressure proportionately between windings of said motors.

6. The combination with a plurality of alternating-current motors connected serially in a circuit bridging between the limbs of an alternating-current circuit, of transformer means for dividing the line-pressure proportionately between the fields of said motors, and transformer means for dividing the pressure proportionately between the armatures of said motors.

7. The combination with a plurality of al ternating-current motors connected serially in a circuit bridging between the limbs of an alternating-current circuit, of an autotransformer for dividing the line-pressure proportionately between the fields of said motors, and an autotransformer for dividing the pressure proportionately between the armatures of said motors.

8. The combination with an autotransformer having its winding connected between the limbs of an alternating-current circuit, of a plurality of motors connected serially together, terminals of said motors being connected with appropriate intermediate points on said autotransformer-winding.

9. The combination with a transformer having a winding connected between the limbs of an alternating-current circuit, of a plurality of motors connected serially together, the terminals of said motors being connected with appropriately-separated points on a winding of said transformer.

10. The combination with a plurality of alternating-current motors connected serially together, the terminals of said motors being connected with appropriate points on a winding of a transformer, and means for including more or less of a winding of said transformer in circuit between the limbs of an alternating-current circuit.

11. The combination with an autotransformer, of a plurality of alternating-current motors connected serially together, the terminals of said motors being connected with appropriate points on the autotransformer-winding, and means for including more or less of said winding serially in circuit with the line-limbs of an alternating-current circuit.

12. The combination with a plurality of alternating-current motors, of electromagnetic means for maintaining at the several motors fixed proportions of the total load delivered by the circuit.

13. The combination with the winding of a transformer, of a plurality of alternating-current motors connected serially together, terminals of said motors being connected with appropriate points on said winding, and switching means for including more or less of said winding in circuit with the limbs of an alternating-current-supply circuit.

14. The combination with a plurality of alternating-current motors connected together and in circuit with the limbs of an alternating-current-supply circuit, of means for dividing the line-pressure proportionately between said motors, and means for increasing the pressure across said motors above that of the line.

15. The combination with a plurality of alternating-current motors connected serially together and with the limbs of an alternating-current-supply circuit, of transformer means for dividing the line-pressure proportionately between said motors, and means for varying the pressure across said series of motors.

16. The combination with a plurality of alternating-current motors connected serially together and with the limbs of an alternating-current-supply circuit, of an autotransformer for dividing the pressure proportionately between said motors, and means for varying the pressure across said series of motors.

17. The combination with an autotransformer, of a series of motors connected together in bridge about part or all of said autotransformer-winding, intermediate terminals of said motors being connected with appropriate intermediate points of the transformer-winding, and means for including different portions of said transformer-winding in circuit between the limbs of an alternating-current-supply circuit.

18. The combination with an autotransformer, of a series of motors connected serially together and bridged about part or all of said autotransformer-winding, intermediate terminals of said motors being connected with appropriate intermediate points on the transformer-winding, and switching means for including different lengths of said transformer-winding in circuit between the limbs of an alternating-current-supply circuit.

19. The combination with a transformer connected with an alternating-current-supply circuit, of a series of alternating-current motors connected serially together, each motor of the series being bridged across an appropriate part of a winding of said transformer, and means for varying the pressure in said transformer-winding.

20. The combination with a transformer connected with an alternating-current-supply circuit, of a series of alternating-current motors connected serially together, each motor of the series being bridged across an appropriate part of a winding of said transformer, and means for changing the points or a point on a winding of the transformer at which the said supply-circuit connects with the said transformer-windings.

21. The combination with an autotransformer connected with an alternating-current-supply circuit, of a plurality of alternating-current motors, the fields of said motors being serially connected together and the terminals thereof connected with appropriate points on the transformer-winding, and an independent circuit connected with the armatures of said motors.

22. The combination with a plurality of alternating-current motors, of an autotransformer, the fields of said motors being connected serially together and the terminals thereof being connected with appropriate points on the autotransformer-winding, an alternating-current-supply circuit, means for including any part of said winding in said supply-circuit, the armatures of said motors being connected serially together, and an additional autotransformer connected from appropriate points with the terminals of said armatures.

23. The combination, with a plurality of alternating-current motors connected serially together in an alternating-current circuit, of an autotransformer, and parts of the winding of said transformer, one of the said parts being bridged about a winding or windings of each motor.

24. The combination, with a plurality of alternating-current motors connected serially together in an alternating-current circuit, of an autotransformer, parts of the winding of said transformer, one of said parts being bridged about a winding or windings of each motor, and means for varying the pressure per unit of length impressed on said transformer-winding.

25. The method of operating a group of alternating-current motors connected serially together, which consists in subjecting each motor to the influence of part of an inductive winding to proportion the pressure between the motors, and varying the pressure across said group of motors.

26. The method of operating a group of alternating-current motors connected serially in circuit, which consists in subjecting said motors to the influence of interrelated inductive windings to equalize or to proportion the pressure between the motors, and varying the pressure across said motors by including more or less of the windings in the supply-circuit.

27. The method of causing motors which are connected together in series to deliver equal amounts of work, which consists in equalizing the pressure at the motors by subjecting each motor to the influence of an appropriate portion of inductance included in the supply-circuit.

28. The combination with a plurality of armature-windings of alternating-current dynamos, of means for maintaining a fixed proportion of the joint load on each armature-winding.

29. The combination of a load or interrelated loads to be driven by a plurality of alternating-current motors connected in series relation, and means for equalizing the electrical pressures applied to the individual motors.

30. The combination with an alternating-current circuit, of an autotransformer with its windings therein, and a plurality of motor-windings connected in series relation, the terminals of said motor-windings being conductively related with points on the winding of said autotransformer.

31. The combination for a polyphase alternating-current circuit, of an autotransformer with its winding relating to a phase, and a plurality of motor-windings connected in series relation, the terminals of said motor-windings being conductively related with points on the winding of the said autotransformer.

32. The combination with a polyphase alternating-current circuit, of serially-connected motor-windings associated with each phase, and means independent of the motors for proportionally dividing the pressure of a phase between the windings associated therewith.

33. The method of compensating the load between a plurality of alternating-current motors with serially-connected windings, which consists in subjecting the series to the total working pressure, dividing the said pressure into proportional parts independently of the effect of the motors, and maintaining one of said parts impressed upon the windings of each motor.

34. The method of compensating the load between a plurality of alternating-current motors with serially-connected windings, which consists in subjecting the series to the total working pressure, dividing the said pressure into equal parts independently of the effect of the motors, and maintaining one of said parts impressed upon the windings of each motor.

35. The method of compensating the load between a plurality of alternating-current motors with serially-connected windings, which consists in subjecting the series to the total working pressure, dividing the said pressure into proportional parts by electromagnetic means independently of the effect of the motors, and maintaining one of said parts impressed upon the windings of each motor.

36. The method of compensating the load between a plurality of alternating-current motors with serially-connected windings, which consists in subjecting the series to the total working pressure, dividing the said pressure into equal parts by electromagnetic means independently of the effect of the motors, and maintaining one of said parts impressed upon the windings of each motor.

37. The method of simultaneously starting and controlling a plurality of alternating-current motors in series circuit which consists in subjecting the series to an electrical pressure, establishing a fixed division of the said total pressure into proportional parts, impressing a part upon each motor, and varying the total pressure.

38. The method of simultaneously starting and controlling a plurality of alternating-current motors in series circuit which consists in subjecting the series to an electrical pressure, establishing a fixed division of the said total pressure into equal parts, impressing a part upon each motor, and varying the total pressure.

39. The method of simultaneously starting and controlling a plurality of alternating-current motors in series circuit which consists in subjecting the series to an electrical pressure, establishing division of the said total pressure into proportional parts by electromagnetic means, impressing a part upon each motor, and varying the total pressure.

40. The method of simultaneously starting and controlling a plurality of alternating-current motors in series circuit which consists in subjecting the series to an electrical pressure, establishing a division of the said total pressure into equal parts by electromagnetic means, impressing a part upon each motor, and varying the total pressure.

41. The method of equalizing the load of alternating-current motors which consists in passing the current for each motor through inductive windings and causing the currents of each of the several motors to react on the circuit of each of the other motors.

42. The method of equalizing the load of alternating-current motors which consists in interlinking the circuits of the several motors by magnetic flux and thereby preventing an unproportional division of the power.

In witness whereof I hereunto subscribe my name this 4th day of May, A. D. 1904.

DUGALD C. JACKSON.

Witnesses:
 WM. B. JACKSON,
 DORA E. CASEY.